Oct. 18, 1955
A. L. JONES ET AL
2,720,978
THERMAL DIFFUSION METHOD
Filed March 1, 1954
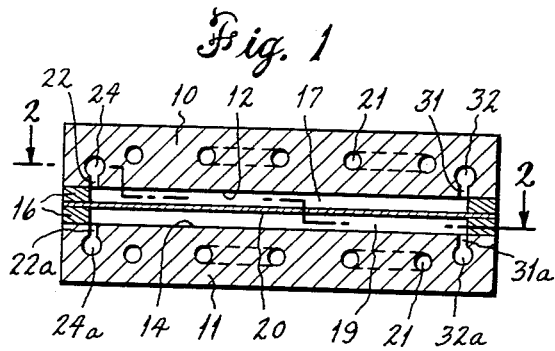
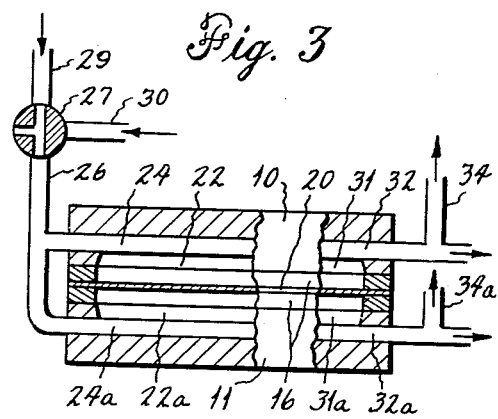
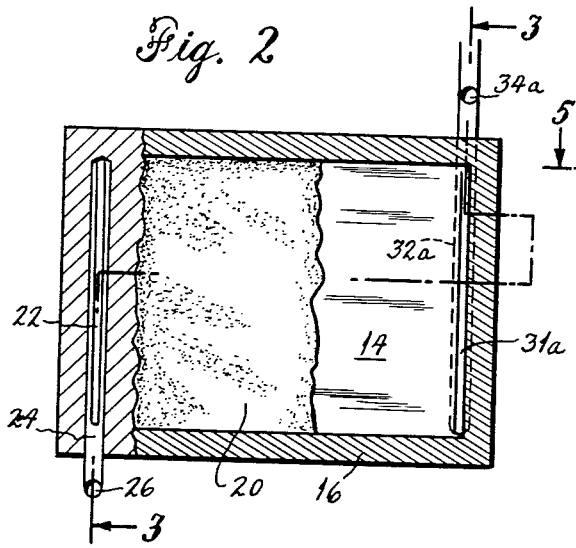
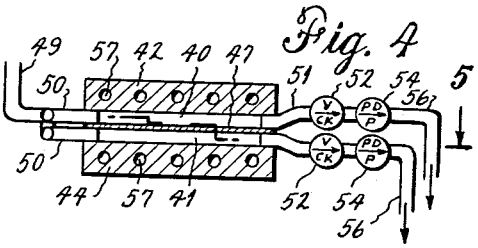
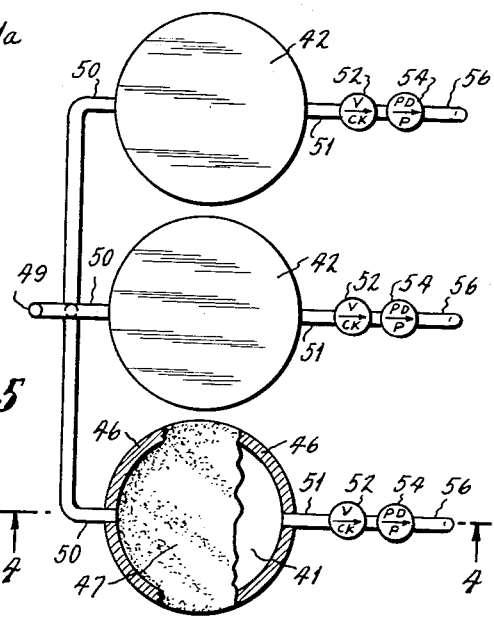
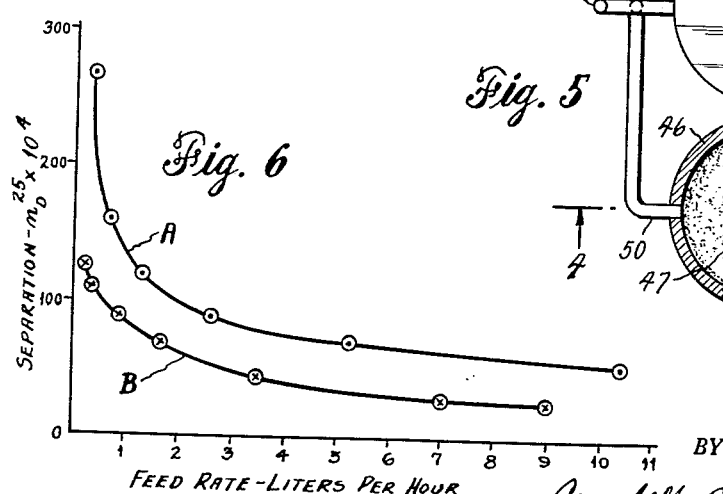
INVENTORS.
ARTHUR L. JONES
RALPH A. GARDNER
CHARLES W. SEELBACH
BY
Campbell, Brumbaugh, Free & Graves
ATTORNEYS

United States Patent Office 2,720,978
Patented Oct. 18, 1955

2,720,978

THERMAL DIFFUSION METHOD

Arthur L. Jones, Lyndhurst, and Ralph A. Gardner, Cleveland, Ohio, and Charles W. Seelbach, West Lafayette, Ind., assignors to The Standard Oil Company, Cleveland, Ohio, a corporation of Ohio Application March 1, 1954, Serial No. 413,348

4 Claims. (Cl. 210—52.5)

The present invention relates to an improved method for separating dissimilar materials in a liquid by liquid thermal diffusion.

It has been known for some time that when a thin film, layer or stream of liquid comprising a mixture of dissimilar materials or a solution has a temperature gradient imposed across it, the kinetic energy of translation imparted thereby to the molecules of one of the dissimilar materials exceeds that imparted to the molecules of one or more other materials, with the result that the material whose molecules have the greatest energy of translation imparted to them moves preferentially toward the cold temperature surface of the film, layer or stream. This process is carried out in apparatus essentially comprising two closely and substantially uniformly spaced wall members defining a narrow separation chamber, one of the wall members being relatively heated and referred to as the "hot wall" and the other of the wall members being relatively cooled and referred to as the "cold wall."

U. S. Patents 2,541,069-71, granted February 13, 1951, to Jones and Hughes, describe methods and apparatus for effecting the separation of dissimilar materials in a liquid mixture in a continuous manner. Since the granting of these patents, proposals have been made, in application Serial No. 218,944 of Jones and Milberger, filed April 3, 1951, now Patent No. 2,712,386, issued July 5, 1955, to modify the separation chamber and the thermal diffusion method by such means as inserting a permeable membrane into the separation chamber, said membrane being intermediate, substantially parallel to and spaced from the chamber-forming walls. Another modification proposed, which has met with considerable success, is that of passing the liquid mixture into one end of a horizontal separation chamber in which the upper chamber-forming wall is the hot wall and the lower chamber-forming wall is the cold wall, whereby the stream of liquid in the chamber becomes resolved into two or more dissimilar fractions that move concurrently through the chamber for withdrawal at points remote from the point of introduction. This method is particularly described and claimed in co-pending application Serial No. 271,181 of Jones and Fay, filed February 12, 1952. Comparative tests have shown the continuous horizontal concurrent flow method to be considerably more efficient at high feed rates than other methods heretofore proposed.

We have made the surprising discovery that the concurrent horizontal flow method described and claimed in application Serial No. 271,181 can be improved considerably by continually repeating a cycle of operations including the successive steps of forming a horizontal layer with the liquid mixture, imposing a temperature gradient vertically across the liquid layer for a preselected time interval, and separately expelling the liquid fractions resolved therein after a short residence time. The expulsion, from the chamber, of the individual fractions can be accomplished by any suitable means, e. g., by gravity or by use of a displacing fluid, and preferably also with the aid of a permeable membrane intermediate, substantially parallel to and spaced from the upper and lower surfaces of the layer, the membrane being sufficiently porous not to hinder molecular movement from one side to the other, but sufficiently impervious to inhibit gross flow of liquid from one side to the other. Thus, for example, the contents may be expelled from a separation chamber, by tilting the apparatus and letting them drain out by gravity, by pumping them out, or by blowing them out with an inert gas such as nitrogen.

We have found that in this type of separation by thermal diffusion the amount or degree of separation obtainable is a function of the residence time and the temperature gradient. The spacing between the hot and cold walls, i. e., the thickness or depth of the liquid mixture in the chamber, is important only in so far as it affects the temperature gradient. Thus, for example, with a temperature difference of 100° F., the amount of separation obtainable is abount the same with a residence time of 6 to 7 minutes and a spacing of 0.01 inch (10,000° F. per inch temperature gradient), as compared with that obtainable for a residence time of about 3 minutes and a spacing of 0.006 inch (16,667° F. per inch temperature gradient). The spacing between the hot and cold walls of the separation chamber may, therefore, be as great as about 0.5 inch. Generally, however, the spacing is desirably less than about 0.15 inch and preferably less than about 0.08 inch in order to achieve a maximum temperature gradient with a minimum temperature difference.

While it is to be understood that the invention is not to be limited by any theory advanced herein, it is believed that the decidedly superior efficiency of the method of this invention over the horizontal concurrent flow method is due in part to the fact, supported by experimental evidence, that separation of the dissimilar materials within the separation chamber actually takes place far more rapidly than hitherto believed, and in part to the fact that the method of the invention substantially eliminates the effect, in the heretofore suggested continuous horizontal concurrent flow method, of the parabolic distribution of laminar flow in which the center portion of the stream moves with maximum velocity and the wall portions are substantially at rest. This parabolic effect is very unfortunate in thermal diffusion separations because the highest concentrations of dissimilar components in a thermal diffusion separation chamber are immediately adjacent the opposed chamber-forming wall surfaces, i. e., where the speed of flow is the lowest, and the degree of separation in the central portion of the chamber, i. e., midway between the walls, is lowest precisely at the point where the speed of flow is the highest. Thus, it is apparent that even the highly efficient separations obtained with horizontal concurrent flow methods at high feed rates represent substantial dilutions of the concentrations actually obtained within the separation chamber.

In accordance with the present method, however, the parabolic flow effect of the continuous method is substantially eliminated and the dilution effect, due to the withdrawal together of the highly concentrated portion immediately adjacent the chamber-forming walls with the less concentrated portion midway between the chamber-forming walls, is greatly minimized. The presence of a permeable membrane intermediate the chamber-forming walls assists in reducing the portion of liquid within the separation chamber that is substantially unchanged, i. e., it reduces the area available for occupancy by liquid that is not resolved into one fraction or the other, and assists in avoiding intermixing by gross flow of the separated fractions when they are individually expelled from the chamber.

The advantages and utility of the method of the invention will become further apparent from the following description made with reference to the accompanying drawing wherein:

Figure 1 is a sectional view in elevation of one form of apparatus suitable for carrying out the method of the invention;

Figure 2 is a plan view of the apparatus shown in Figure 1 shown on section line 2—2;

Figure 3 is an end view in elevation, partly in section, taken along section line 3—3 of Figure 2;

Figure 4 is a sectional view in elevation of another form of apparatus suitable for carrying out the method of the invention;

Figure 5 is a plan view, partly in section taken along section line 5—5 of Figure 4, of the apparatus shown in Figure 4; and Figure 6 is a graphical comparison of the results obtainable with the method of the invention and under substantially identical conditions with the continuous horizontal concurrent flow method heretofore proposed.

Referring now to Figures 1, 2 and 3, included merely to assist in illustrating one embodiment of the method of the invention, the apparatus shown therein includes a hot wall 10 and a cold wall 11, the opposed surfaces 12 and 14, respectively, of which are separated from one another by gaskets 16 or the like to form a narrow or shallow separation chamber having an upper portion 17 and a lower portion 19 separated by a permeable membrane 20. The hot and cold walls 10 and 11 are provided with suitable means, such as coils 21 or the like, for relatively heating and cooling them.

In the apparatus shown, the hot wall 10 is provided with a feed port 22 communicating with a conduit 24 that in turn communicates with a header 26 provided with a three-way valve 27 or equivalent means for selectively communicating with a source of liquid by way of line 29 and a source of expelling fluid by way of line 30. The cold wall 11 is similarly provided with an inlet port 22a communicating with a conduit 24a that in turn connects with the header 26.

At the opposite end of the separation chamber the hot wall 10 is provided with an outlet port 31 communicating with a conduit 32 provided with a suitable means, such as a standpipe or vent tube 34, for separating the fraction expelled through conduit 32 from the expelling fluid. The cold wall 11 is similarly provided with an outlet port 31a and a conduit 32a having a standpipe or vent tube 34a.

In operation, the liquid to be subjected to thermal diffusion is alternately fed to the separation chamber 17, 19 by way of line 29, valve 27, header 26, conduits 24 and 24a and inlet ports 22 and 22a until the chamber is filled and, after a short residence time, the valve 27 is turned so as to admit the expelling fluid by way of line 30, header 26, conduits 24 and 24a and inlet ports 22 and 22a into the upper and lower portions 17 and 19 of the separation chamber. The expelling or displacing fluid effectively removes substantially all of the liquid in chamber portions 17 and 19 through outlets 31 and 31a and conduits 32 and 32a, respectively. If the expelling fluid is lighter than the liquid fractions, e. g., if it is a gas, it is effectively separated from the fractions by means of standpipes 34, 34a, or the like. The apparatus is then ready for another cycle beginning with the introduction of a further amount of liquid for separation in the separation chamber.

Referring now to Figures 4 and 5 illustrating another embodiment of the invention, the apparatus shown includes three shallow thermal diffusion chambers each having upper and lower portions 40 and 41, respectively, and formed by hot walls 42, cold walls 44, gaskets 46 and permeable membranes 47. The separation chambers of the units are operatively connected to a source of liquid mixture by way of line 49 and one or more branch lines 50. Each of the upper and lower portions 40 and 41 of the chambers are connected, by way of lines 51, discharge control means such as check valves 52 and positive displacement pumps 54, to discharge lines 56.

In operation, the liquid mixture enters the apparatus by way of line 49 and branch lines 50 to fill the upper and lower portions 40 and 41 of the separation chambers. The hot walls 42 and the cold walls 44, which are provided with suitable means such as coils 57 or the like for relatively heating and cooling them, are maintained at different temperatures in order to impose a temperature gradient across the liquid mixture in the separation chambers. After a preselected residence time, during which the dissimilar molecules in the liquid mixture will have passed through the permeable membranes 47 in opposite directions, the fractions in the upper portions 40 and the fractions in the lower portions 41 are separately removed by way of lines 51, check valves 52 and displacement pumps 54 and discharge lines 56. Each positive displacement pump 54 is, in the embodiment illustrated, preferably operated intermittently for intervals just sufficient to displace a volume substantially equal to the volume of the upper or lower portion of the separation chamber to which it is connected so that substantially all of the liquid fraction in that portion of the chamber will, at the end of its residence time therein, be withdrawn during one such interval of operation, e. g., with one stroke of the pump.

It is to be understood of course that the apparatus illustrated in Figures 4 and 5 can be operated most effectively in such manner that the effective flow of liquid mixture through the line 49 and the discharge of separated fractions through discharge lines 56 will be substantially continuous and may be modified considerably, particularly with reference to the discharge control means. Thus, for example, liquid mixture may be introduced successively into a first and second unit during the residence time of a liquid and a third unit and, depending upon the preselected residence time and the time required to expel the separated fractions and fill the chamber with liquid mixture, the number of units operated at one header 49 can be varied at will. The actual size and shape of the units illustrated in Figures 4 and 5 is no more critical than the size and shape of the unit illustrated in Figures 1 to 3. As a practical matter, small disk-like units having a diameter as small as or smaller than one inch have the advantage of reducing to a minimum the difficulty of maintaining the proper spacing of the permeable membrane 47 from the hot and cold walls 42 and 44, respectively.

It will be immediately apparent, of course, that many refinements are possible in the design of the apparatus and the means for controlling the flow of liquid into and out of the chamber. It is manifestly also possible to provide inlet ports intermediate the ends of the chamber and to provide outlets at opposite ends so that when the fractions are expelled from the chamber, portions of the same fractions will flow in opposite directions.

Figure 6 is a graphic representation comparing the results obtained at various feed rates and with essentially the same apparatus by, on the one hand utilizing the method of the present invention and, on the other hand, utilizing the continuous concurrent flow method heretofore proposed. In each instance the thermal diffusion separation chamber was formed by 9" x 9" plates, the chamber-forming surfaces of which were spaced 0.030" apart. The hot wall was maintained at a temperature of 270° F. and the cold wall was maintained at 70° F., the temperature gradient therefore being 6667° F. per inch. The feed in each test consisted of a mixture of equal volumes of cetane and monomethyl naphthalene.

In run A, the separation chamber was provided with a porous paper membrane having a thickness of 0.0045". The feed was charged to the chamber simultaneously on both sides of the porous membrane through inlets corresponding to 22 and 22a and, after predetermined residence times, blown out through ports corresponding to outlets 31 and 31a by means of compressed nitrogen.

In run B, the feed was introduced continuously and at various predetermined feed rates into the separation chamber at one end and removed at the other end through ports corresponding to outlets 31 and 31a.

The fractions removed in runs A and B through outlets 31 and 31a were tested for index of a refraction, and the degree of separation obtained was determined by the difference between the refractive indices, measured at 25° C., of these fractions. The results of run A were corrected to take into account a 25% dilution of the separated fractions by virtue of liquid holdup in those portions of the apparatus, i. e., the feed and outlet conduits, wherein the liquid is not subjected to thermal diffusion.

The results of these tests are tabulated immediately below and are illustrated graphically in Figure 6 wherein curve A shows the results of run A, i. e., the intermittent feed method of the invention, and curve B shows the results of run B, i. e., the continuous, horizontal, concurrent feed method.

TABLE I

| Intermittent Operation | | | Continuous Operation | |
|---|---|---|---|---|
| Residence Time (min.) | Feed Rate, Liters/hr. | Separation, $n_D{}^{25} \times 10^4$ | Feed Rate, Liters/hr. | Separation, $n_D{}^{25} \times 10^4$ |
| 6.85 | 0.35 | 270 | 0.2 | 123 |
| 3.7 | 0.65 | 160 | 0.4 | 112 |
| 1.85 | 1.30 | 120 | 0.9 | 90 |
| .92 | 2.61 | 91 | 1.7 | 68 |
| .46 | 5.22 | 72 | 3.5 | 43 |
| .23 | 10.44 | 56 | 7.0 | 30 |
| ---------- | ---------- | ---------- | 9.0 | 28 |

This data demonstrates conclusively the greatly superior results obtainable by the intermittent method of the invention, as compared with the continuous concurrent flow method hitherto believed to be most efficient at higher feed rates. It is apparent that the intermittent method of the invention more than combines the high efficiency of the continuous concurrent horizontal method at higher feed rates with the superior high efficiency of center feed vertical countercurrent flow methods at low feed rates.

Further tests were made with essentially the same apparatus at various temperature gradients and feed rates, the permeable membrane in each run being similar to that employed in run A. The results of these tests are tabulated in Table II below:

TABLE II

| Run No. | Hot Wall Temp. | Cold Wall Temp. | Separation Chamber Width, Inches | Temp. Gradient, °F./in. | Residence Time (min.) | Feed Rate, l/hr. | Average Separation, $n_D{}^{25} \times 10^4$ |
|---|---|---|---|---|---|---|---|
| 1 | 305 | 80 | 0.050 | 4,500 | 0.25 | 16 | 31 |
|   |     |    |       |       | 0.5  | 8  | 32 |
|   |     |    |       |       | 1    | 4  | 31 |
|   |     |    |       |       | 2    | 2  | 49 |
|   |     |    |       |       | 4    | 1  | 65 |
|   |     |    |       |       | 8    | .5 | 96 |
|   |     |    |       |       | 15   | .266 | 137 |
| 2 | 240 | 73 | 0.050 | 3,340 | 0.25 | 16 | 15 |
|   |     |    |       |       | 0.5  | 8  | 17 |
|   |     |    |       |       | 1    | 4  | 24 |
|   |     |    |       |       | 2    | 2  | 26 |
|   |     |    |       |       | 4    | 1  | 39 |
|   |     |    |       |       | 8    | .5 | 57 |
|   |     |    |       |       | 15   | .266 | 85 |
| 3 | 322 | 67 | 0.072 | 3,550 | 0.5  | 11.5 | 26 |
|   |     |    |       |       | 2    | 2.88 | 40 |
|   |     |    |       |       | 4    | 1.44 | 48 |
|   |     |    |       |       | 8    | .72  | 71 |
|   |     |    |       |       | 15   | .383 | 97 |
|   |     |    |       |       | 30   | .1915 | 142 |
| 4 | 240 | 58 | 0.072 | 2,530 | 0.5  | 11.5 | 11 |
|   |     |    |       |       | 1    | 5.76 | 19 |
|   |     |    |       |       | 2    | 2.88 | 20 |
|   |     |    |       |       | 4    | 1.44 | 25 |
|   |     |    |       |       | 8    | .72  | 37 |
|   |     |    |       |       | 15   | .383 | 54 |
|   |     |    |       |       | 30   | .1915 | 86 |
|   |     |    |       |       | 80   | .072 | 160 |
| 5 | 175 | 56 | 0.073 | 1,630 | 2    | 2.88 | 14 |
|   |     |    |       |       | 4    | 1.44 | 16 |
|   |     |    |       |       | 8    | .72  | 24 |
|   |     |    |       |       | 15   | .383 | 36 |
|   |     |    |       |       | 30   | .1915 | 47 |
|   |     |    |       |       | 70   | .082 | 76 |

The data in Table II are believed to demonstrate conclusively the efficacy and utility of the method of the invention, as well as to show that the degree of separation obtainable is a function of the temperature gradient and the feed rate or residence time.

It is to be understood that numerous modifications will immediately occur to those skilled in the art upon reading this description. All such modifications are intended to be included within the scope of the invention as defined in the accompanying claims.

We claim:

1. A method for separating dissimilar materials in a liquid by liquid thermal diffusion which comprises continually repeating a cycle of operations including the successive steps of filling a space defined by two substantially horizontal and opposed surfaces spaced substantially equidistantly apart with a liquid mixture, imposing a temperature gradient vertically across the liquid for a preselected time interval, whereby said mixture is resolved into an upper fraction and a dissimilar lower fraction, and separately expelling the upper and lower fractions from the space.

2. A method for separating dissimilar materials in a liquid by liquid thermal diffusion which comprises continually repeating a cycle of operations including the successive steps of forming a substantially horizontal layer defined by closely spaced and substantially parallel upper and lower surfaces of liquid mixture; subjecting the upper surface thereof to a considerably higher temperature than said lower surface for a preselected time interval, whereby the liquid mixture is resolved into an upper fraction and a dissimilar lower fraction; and separately expelling the upper and lower fractions from the chamber by displacement with an inert gas.

3. A method for separating dissimilar materials in a liquid by liquid thermal diffusion which comprises continually repeating a cycle of operations including the successive steps of filling, with a liquid mixture, a space defined by two substantially horizontal and opposed surfaces spaced substantially equidistantly apart and provided with a liquid permeable membrane intermediate, substantially parallel to and spaced from said upper and lower surfaces, the upper surface being maintained at a temperature considerably higher than said lower surface; and after a pre-selected time interval separately expelling the upper and lower fractions accumulated above and below the permeable membrane through outlets at one end of the chamber by admitting an inert gas under superatmospheric pressure into the chamber at the opposite end.

4. A method for separating dissimilar materials in a liquid by liquid thermal diffusion which comprises successively filling, with a liquid mixture, a plurality of spaces, each space being defined by two substantially horizontal and opposed surfaces spaced substantially equidistantly apart, imposing a temperature gradient vertically across the liquid within each space for a preselected time interval, whereby said mixtures are resolved into upper fractions and dissimilar lower fractions, separately expelling the upper and lower fractions from each space and staggering the filling, residence time and expulsion of fractions from the various spaces to obtain substantially continuous discharges of the separated fractions from said plurality of spaces.

References Cited in the file of this patent

UNITED STATES PATENTS

| | | |
|---|---|---|
| 1,035,813 | Rice | Aug. 13, 1912 |
| 2,521,113 | Beams | Sept. 5, 1950 |
| 2,541,069 | Jones et al. | Feb. 13, 1951 |
| 2,541,070 | Jones et al. | Feb. 13, 1951 |
| 2,541,071 | Jones et al. | Feb. 13, 1951 |
| 2,567,765 | Debye | Sept. 11, 1951 |
| 2,585,244 | Hanson | Feb. 12, 1952 |